(12) United States Patent
Kawano et al.

(10) Patent No.: US 8,137,778 B2
(45) Date of Patent: Mar. 20, 2012

(54) WEIGHT FOR VIBRATION MOTOR

(75) Inventors: Masatoshi Kawano, Tottori (JP); Mikio Umehara, Tottori (JP); Daichi Kadowaki, Tottori (JP)

(73) Assignee: Minebea Motor Manufacturing Corportion, Tokyo (JP)

( * ) Notice: Subject to any disclaimer, the term of this patent is extended or adjusted under 35 U.S.C. 154(b) by 549 days.

(21) Appl. No.: 12/386,714

(22) Filed: Apr. 22, 2009

(65) Prior Publication Data
US 2009/0269525 A1 Oct. 29, 2009

(30) Foreign Application Priority Data
Apr. 24, 2008 (JP) ................... 2008-113955

(51) Int. Cl.
*B29D 22/00* (2006.01)
*B29D 23/00* (2006.01)
*B32B 1/08* (2006.01)
*B32B 15/08* (2006.01)

(52) U.S. Cl. ............... 428/35.8; 428/35.7; 428/36.9; 428/36.91; 310/81

(58) Field of Classification Search .......... 428/35.7, 428/35.8, 36.9, 36.91; 310/81
See application file for complete search history.

(56) References Cited

U.S. PATENT DOCUMENTS
2006/0284501 A1   12/2006   Takagi et al.

FOREIGN PATENT DOCUMENTS
| JP | 09-182363 | 7/1997 |
| JP | 10-336949 | 12/1998 |
| JP | 2006-345599 | 12/2006 |

*Primary Examiner* — Michael C Miggins
(74) *Attorney, Agent, or Firm* — Carrier Blackman & Associates, P.C.; Joseph P. Carrier; William D. Blackman

(57) ABSTRACT

A weight for a vibration motor, the weight including: a resin part including: a semi-cylindrical portion having a shaft hole in which a rotary shaft is fitted and expanding radially from the shaft hole at a given center angle so as to be eccentrically weighted with respect to the shaft hole; and a pair of locking projections respectively disposed at both axial end areas of an outer circumferential surface of the semi-cylindrical portion so as to extend radially outwardly therefrom; and a metal part attached to the resin part so as to sit on the outer circumferential surface of the semi-cylindrical portion, the metal part including: a pair of locking recesses positioned and configured to correspond respectively to the locking projections of the resin portion, wherein an elevated portion formed between the pair of locking recesses makes contact with the pair of locking projections of the resin portion.

8 Claims, 13 Drawing Sheets

WEIGHT FOR VIBRATION MOTOR

CROSS-REFERENCE TO THE RELATED APPLICATION(S)

The present application is based upon and claims priority from prior Japanese Patent Application No. 2008-113955, filed on Apr. 24, 2008, the entire content of which are incorporated herein by reference.

TECHNICAL FIELD

The present invention relates to a weight for a vibration motor for generating vibration in electronic equipments such as a mobile phone.

BACKGROUND

A weight for vibration motors has conventionally been formed of tungsten which has a large specific gravity so as to increase a vibration amount.

When a weight made only of tungsten is attached to a shaft (a rotating shaft) of a motor, the shaft needs to be press-fitted in a through-hole of the weight as disclosed in JP-A-2006-345599 (counterpart U.S. publication is: US 2006/0284501 A1), or alternatively, an opening provided in the weight needs to be crimped so that the weight is secured to the shaft as disclosed in JP-A-10-336949.

In the case when the shaft is press-fitted in the through-hole, a powerful and massive press fitting apparatus is used thus requiring a large-scale manufacturing system, and the number of manufacturing steps increases.

On the other hand, in the case when the opening is crimped to the shaft, the shaft is secured by the deformation of the crimped portion, wherein the fastening force at the crimped portion may decrease over time due to deterioration with age while the crimped portion receives stress and vibration during the motor rotation.

Furthermore, since the conventional vibration motor weight is made of a uniform material having a high specific gravity, the rotational moment is inevitably large which is unfavorable to the start-up characteristics. Additionally, since the conventional weight has a large mass, the starting current of the motor is increased to such an extent as to cause a problem. Further, since the weight is wholly made of tungsten, which is expensive, the production cost is increased.

In order to solve these problems, the weight of a vibration motor weight is reduced, the rotation performance of a vibration motor is enhanced. In addition, to reduce the production costs, the vibration motor weight is secured to a shaft of the vibration motor with a resin. An example of such configuration is disclosed in JP-A-9-182363.

FIGS. 8A-8E are diagrams showing some configurations of vibration eccentric weights disclosed in the publication JP-A-9-182363.

As viewed in cross section, an eccentric weight 100 shown in FIG. 8A is made of a substantially trapezoidal weight part 101 and a resin part 102 in which a shaft holding portion 102b is provided on a semi-circular portion 102a which grips the weight part 101 in such a manner as to project therefrom.

As viewed in cross section, in the substantially trapezoidal weight part 101, a top side 101a of the trapezoid configures a continuous arc together with an outer circumferential side 102c of the resin part. A horizontal distance or width A between lateral sides 101b of the weight part 101 is moderately narrowed or decreased as they extend towards the top side 101a.

As viewed in cross section, while the resin part 102 is configured to grip the lateral sides 101b the horizontal width between which is moderately decreased as they extend towards the top side 101a of the weight part 101, since the horizontal width A is made to be decreased moderately, the holding force of the resin part 102 with which the weight part 101 is held thereby is weak and is more or less a force which can resist a centrifugal force generated when the weight part 101 rotates.

Accordingly, a structural problem resides in the resin part 102 that in the event that an excessive impact which exceeds an anticipated centrifugal force is applied to the resin part 102, the resin part 102 is forcibly expanded to such an extent that it fails by the weight part 101.

As viewed in cross section, an eccentric weight 110 shown in FIG. 8B is made of a substantially arc-shaped weight part 111 having a constant width B and a resin part 112 in which a shaft holding portion 112b is provided on a semi-circular portion 112a which grips the weight part 111 in such a manner as to project therefrom.

As viewed in cross section, in the weight part 111, an outer arc-shaped side 111a of the weight part 111 configures a continuous arc together with a circumferential side 112c of the resin part 112. A horizontal width C between lateral sides 111b of the weight part 111 is gradually increased as they extend towards the outer arc-shaped side 111a.

As viewed in cross section, while the resin part 112 is configured in such a manner as to grip the lateral sides the horizontal width C between which is made to be increased gradually as they extend towards the outer arc-shaped side 111a of the weight part 111, since the horizontal width C is made to be increased gradually towards the outer arc-shaped side 111a, the holding force of the resin part 112 with which the weight part 111 is held thereby is extremely weak. Because of this, the weight part 111 is held on to the resin part 112 by virtue of the adhesion of an adhesive, and the holding force of the resin part 112 with which the weight part 111 is held thereby is more or less a force which can resist a centrifugal force generated when the weight part 111 rotates.

Accordingly, a structural problem resides in the resin part 112 that in the event that an excessive impact which exceeds an anticipated centrifugal force is applied to the resin part 112, the resin part 112 becomes unable to hold the weight part 111.

As viewed in cross section, an eccentric weight 120 shown in FIG. 8C is made of a semi-circular arc-shaped weight part 121 having a constant width D and a resin part 122 in which a shaft holding portion 122b is provided on a semi-circular portion 122a which holds the weight part 121 on an outer side thereof with an adhesive in such a manner as to project therefrom. As viewed in cross section, the resin part 122 is configured to hold the weight part 121 on the outer side thereof with the adhesive. Because of this, the weight part 121 is held on to the resin part 122 by virtue of the adhesion of the adhesive, and the holding force of the resin main body 122 with which the weight part is held thereby is more or less a force which can resist a centrifugal force generated when the weight part 121 rotates.

Accordingly, a structural problem resides in the resin part 122 that in the event that an excessive impact which exceeds an anticipated centrifugal force is applied to the resin part 122, it is anticipated that the resin part 122 becomes unable to hold the weight part 121.

An eccentric weight 130 shown in FIG. 8D illustrates an example in which the weight part of the eccentric weight shown in FIG. 8A is divided into two weight parts 131a, 131b of a smaller size, and this involves the same structural problem as that of the eccentric weight of FIG. 8A.

An eccentric weight 140 shown in FIG. 8E illustrates an example of a resin part 142 in which a side confronting a semi-circular arc-shaped side is made of straight lines E which are connected to each other in such a manner that a shaft holding portion 141 does not project therefrom, and this involves the same structural problem as that of the eccentric weight of FIG. 8A.

Thus, it is said that in the related-art eccentric weights shown in FIGS. 8A-8E, the resin part has the holding force which is more or less the force which can resist the centrifugal force which is applied to the weight part in the radial direction when the eccentric weight rotates in cooperation with the adhesive.

In particular, when viewing only the configurations of the eccentric weights themselves without considering the adhesion of the adhesive, in the examples shown in FIG. 8A, the configuration in which the resin part holds the weight part relies only on the wedge configuration which tapers with a slight inclination, and hence, the resin part cannot hold the weight part strongly and rigidly. When looking at the examples shown in FIGS. 8B and 8C from the same viewpoint, no configuration for holding the weight part is adopted.

The related art examples have the problem that they adopt the configurations having the extremely weak holding force or no holding force in consideration of the centrifugal force applied to the weight part.

Further, in recent years, there is emerging a demand to resist an unexpected strong impact such as impact resulting from the fall of a vibration motor. However, it can be said when looking at their configurations that the related art examples have a problem that they cannot resist such an impact.

SUMMARY

One of objects of the present invention is to provide a weight for a vibration motor which can maintain a good impact resistance without reducing the amount of vibration while reducing the utilization amount of a material having a high specific gravity.

A vibration motor weight according to an aspect of the invention includes a resin part in which a predetermined center angle portion (semi-cylindrical portion) extends radially from an axis center of a shaft hole and locking projections are provided integrally at axial ends thereof (axial end areas) and a metal part having locking recesses which closely contact and cover the predetermined center angle portion of the resin part and which are locked, respectively, on the locking projections.

In detail, the vibration motor weight includes the resin part in which a semi-tubular portion is formed integrally on a longitudinal flat surface side of a semi-cylindrical portion in such a manner as to form the shaft hole together with the semi-cylindrical portion and the locking projections are formed integrally at the ends of the semi-cylindrical portion in the longitudinal direction of the shaft hole and the metal part which sits on a radially outer side (outer circumferential surface) of the resin part including the locking projections in such a manner that an outer surface of the metal part configures a semi-tubular surface.

Radial and axial impacts applied to the metal part are suppressed by locking the metal part on the locking projections of the resin part.

The locking projection may be formed into an edged T-shaped projecting portion which projects radially outwards from an outer surface of the semi-cylindrical portion.

The locking projection may be formed into an edged locking projection. Since corners of a top surface of the edged locking projections form edges (right angles), as a result, an angle formed by the outer surface of the semi-cylindrical portion and a lateral side of the edged locking projection is formed as a right angle.

The locking projection may be formed into a tapered arc-shaped projecting portion (triangular shape in an axial cross section). When used herein, taper means basically that a rising angle of the locking projection from the outer surface of the semi-cylindrical portion in the axial direction becomes an arbitrary angle ranging from 0 degree to 90 degrees. The rising angle is preferably in the range of 26 degrees±4 degrees.

Since a top surface of the tapered arc-shaped projecting portion is formed into a tapered face (axially inner face) having no angle at an opposite side to the axial end face of the semi-cylindrical portion, as a result, an angle formed by the outer surface of the semi-cylindrical portion and the tapered arc-shaped projecting portion, that is, the rising angle in the axial direction is formed as an arbitrary angle ranging from 0 degree to 90 degrees, and an angle in a circumferential direction is formed as a right angle.

The following configurations may be adopted.

(1) A weight for a vibration motor includes: a resin part including: a semi-cylindrical portion having a shaft hole in which a rotary shaft is fitted and expanding radially from the shaft hole at a given center angle so as to be eccentrically weighted with respect to the shaft hole; and a pair of locking projections respectively disposed at both axial end areas of an outer circumferential surface of the semi-cylindrical portion so as to extend radially outwardly therefrom; and a metal part attached to the resin part so as to sit on the outer circumferential surface of the semi-cylindrical portion, the metal part comprising: a pair of locking recesses positioned and configured to correspond respectively to the pair of locking projections of the resin portion, wherein an elevated portion formed between the pair of locking recesses makes contact with the pair of locking projections of the resin portion.

(2) The locking projections of the resin part may have a triangular shape in an axial cross section.

(3) The locking projections may each include an axially inner face inclined with respect to a longitudinal direction of the shaft hole; and a pair of circumferential end faces may be engaged respectively with a pair of circumferential end faces of each of the locking recesses of the metal part.

(4) The locking projections of the resin part may have a substantially rectangular shape in an axial cross section.

(5) The locking projections may each include: a top face; an axially inner face connecting between the top face and the outer circumferential surface of the semi-cylindrical portion and oriented substantially perpendicular to the top face and the outer circumferential surface; and a pair of circumferential end faces engaged respectively with a pair of circumferential end faces of each of the locking recesses of the metal part.

(6) The locking projections of the resin part may have a substantially T-shape in a radial cross section wherein a base portion extends radially outwardly from the outer circumferential surface of the semi-cylindrical portion and a pair of arm portions extend circumferentially from a distal end of the base portion in respective opposite directions.

(7) The elevated portion of the metal part may be configured to make contact with axially inner faces of the locking projections of the resin part.

(8) The center angle of the semi-cylindrical portion of the resin part may be set to an angle obtained as a required amount of vibration from center angle variation characteristics of a vibration amount in the weight for a vibration motor when the metal part has a constant radial dimension.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

Figure 1A:
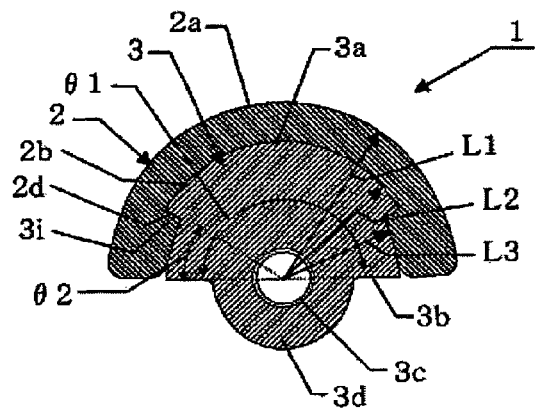
FIGS. 1A-1H are explanatory diagrams showing configurations of a vibration motor weight which employs tapered locking projections.

Embodiments according to the present invention will be described in detail with reference to the accompanying drawings. The scope of the claimed invention should not be limited to the examples illustrated in the drawings and those described in below.

A vibration motor weight of the invention includes a resin main body portion which has a shaft hole into which a shaft of a vibration motor is fitted (inserted in a fitted state) and in which a predetermined angle portion extends from a center axis of the shaft hole in a radial direction (a direction extending radially from the center axis orthogonal to the center axis) and locking projections are provided integrally at axial ends thereof and a metal part having locking recesses which closely contact and cover the predetermined angle portion of the resin part and which are locked on the locking projections, respectively.

The locking projection and the locking recess can be configured arbitrarily, provided that configurations adopted function as required or designed or to prevent or suppress the dislocation of the metal part from the resin main body or the damage to the resin part when not only a expected centrifugal force generated when the weight rotates but also impact generated otherwise such as when the motor happens to fall are applied to the weight.

Hereinafter, three representative combinations of locking projections and locking recesses will be described which employ tapered arc-shaped locking projections, edged arc-shaped locking projections and T-shaped locking projections, respectively.

First Embodiment

FIGS. 1A-1H show explanatory diagrams showing configurations of a weight for a vibration motor according to a first embodiment, which employs tapered arc-shaped locking projections.

Figure 1B:

FIG. 1A is a side view of the vibration motor weight employing the tapered arc-shaped locking projections when viewed in an axial direction, FIG. 1B is a perspective view of the same vibration motor weight as viewed from therebelow, and FIGS. 1C-1H are explanatory diagrams explaining impact suppressing functions.

Figure 1C:
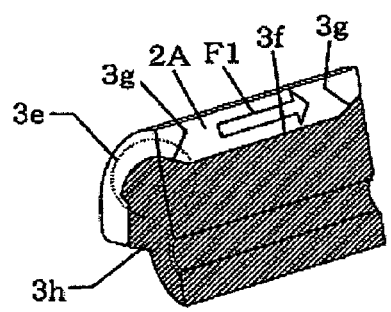
Figure 1D:
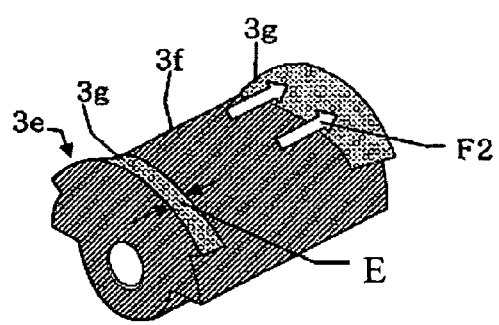

FIG. 1C is an explanatory diagram explaining a case where an axial impact force is being applied to the weight or mainly to a metal part, in which the metal part is shown by solid lines as being transparent. FIG. 1D is an explanatory diagram explaining how a resin part functions to suppress the impact force in FIG. 1C.

Figure 1E:
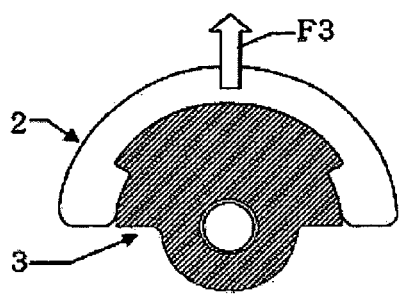
Figure 1F:
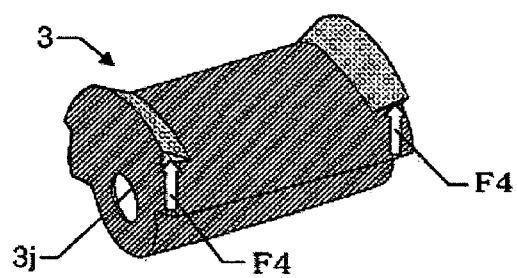

FIG. 1E is an explanatory diagram explaining a case where a radial impact force is being applied similarly to the metal part, in which the metal part is shown by solid lines as being transparent. FIG. 1F is an explanatory diagram explaining how the resin part functions to suppress the impact force in FIG. 1E.

Figure 1G:
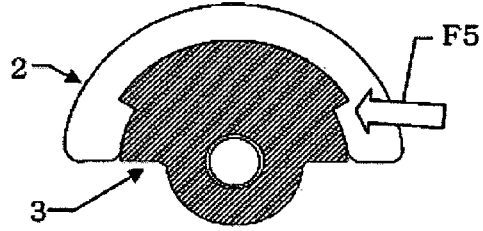
Figure 1H:
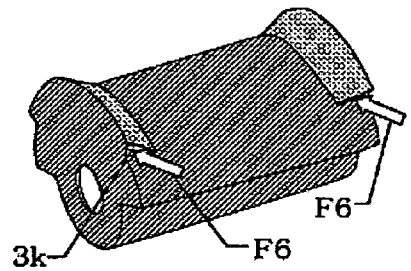

FIG. 1G is an explanatory diagram explaining a case where an impact force is being applied similarly to the metal part in a direction which is orthogonal to the axial direction and the radial direction, in which the metal part is shown by solid lines as being transparent. FIG. 1H is an explanatory diagram explaining how the resin part functions to suppress the impact force in FIG. 1G.

A vibration motor weight 1 is basically an eccentric weight and is made of a metal part 2 and a resin part 3. The vibration motor weight 1 is configured in such a manner that the metal part 2 is securely attached to a shaft (whose illustration is omitted) of a vibration motor by the resin part 3.

In addition, the vibration motor weight is basically made of the resin part 3 in which, for example, as is shown in the side view in FIG. 1A and in the perspective view in FIG. 1B, a semi-tubular portion 3d is formed integrally on a flat surface side 3b of a semi-cylindrical portion 3a in a longitudinal direction in such a manner as to form a shaft hole 3c together with the semi-cylindrical portion 3a and as is shown in FIGS. 1C and 1D, locking projections 3e are formed integrally at axial ends of the semi-cylindrical portion 3a in a longitudinal direction of the shaft hole 3c and the metal part 2 which covers a radially outer side of the resin part 3 including the locking projections 3e in such a manner that an outer side of the metal part 2 configures a tubular surface 2a. The shaft (the rotating shaft whose illustration is omitted) of the vibration motor is fittingly disposed in the shaft hole 3c.

Specifically, the resin part 3, which is basically configured in the way described above and which has the locking projections which are formed into tapered arc-shaped locking projections, is formed from a resin having a necessary impact strength and a necessary heat resistance, for example, Genestar® G2330 (made by Kuraray Co., Ltd., Japan). The semi-tubular portion 3d is formed integrally on the flat surface side of the semi-cylindrical portion 3a in the longitudinal direction in such a manner that the shaft hole 3c is formed together with the semi-cylindrical portion 3a, and the locking projections 3e are formed integrally at the ends of the semi-cylindrical portion 3a in the longitudinal direction (the axial direction) of the shaft hole 3c. The locking projections 3e denote radial projecting portions (portions where tapered faces 3g are formed) from a central outer surface (an outer surface of an area where no tapered face 3g is formed) of the semi-cylindrical portion 3a and extensions thereof.

The locking projections 3e are each formed into the tapered arc-shaped locking projection, and as is shown in FIG. 1C which is an axial sectional view of the vibration motor weight taken along the axial direction of the shaft hole 3c and in FIGS. 1D, 1F and 1H which shows the resin part 3, the tapered faces 3g are provided on the locking projections 3e in such a manner that their radii from the axis center decrease as they extend from the axial ends 3h towards the center of the resin main part 3.

As is shown in FIG. 1D, the tapered faces 3g so provided are each formed into a strip-like shape having a predetermined width E measured from each axial end 3h and extending in a rotational direction over a predetermined center angle range from the center axis. As is shown in FIG. 1A, a center angle θ1 of the resin part 3 is 180 degrees, and a center angle of the tapered face 3g is referred to as an angle which results after an angle twice an angle θ2 which corresponds to a length from the flat surface side 3b to a cut-off 3i on which a locking recess 2b of the metal part 2 is locked is deducted from 180 degrees. As is shown in FIGS. 1F and 1H, a cut-off face 3j of the cut-off 3i which is oriented in the rotational direction configures a triangle due to the tapered face 3g which tapers from the axial end towards the center of the resin part 3.

The angle of the cut-off 3i is set to an angle at which the metal part 2 is prevented from being displaced from the resin part 3 even when an impact force is applied to the weight in directions indicated by arrows in FIGS. 1E and 1G, that is, for example, an angle of 90 degrees±5 degrees.

Axial surfaces shown in FIG. 1F which are formed at the ends of the locking projections 3e in the rotational direction as the cut-off 3i reaching the outer surface 3f of the resin part 3 are each referred to as the cut-off face 3j of the locking projection 3e which is oriented in the rotational direction or the side face 3j. These side faces 3j are provided in four locations in total on the resin part 3, two at each axial end 3h of the resin part 3.

The resin part 3 is formed by a resin injection molding technique such as an injection molding technique. Since structurally, end portions 2c of the metal part 2 are exposed from the resin part 3, for example, when injection molding a resin part main body 3, the metal part 2 is disposed to be erected within the dies in such a manner that one end portion 2c of the metal part contacts a bottom surface within the dies, and a resin is injected into the dies in such a state. The resin so injected comes to stay on an inside of the metal part 2 and is then allowed to set there. Because of this, in the weight according to the embodiment, since the end portions 2c of the metal part 2 are level with the corresponding end faces of the resin part 3, the manufacturing system and manufacturing process can be made easy and simple.

The metal part 2 is made of a material having a high specific gravity such as, particularly, tungsten (W) or lead (Pb). The metal part 2 is formed in such a manner as to cover the resin part 3 in the radial direction and its radial outer surface is formed into the tubular surface 2a. The locking recesses 2b of the metal part 2 are configured in such a way as to be combined with the corresponding locking projections 3e of the resin part 3. The locking recess 2b has recessed lateral faces 2d which are brought into engagement with the side faces 3j of the corresponding locking projection 3e.

An elevated portion 2A is provided between the locking recesses 2b at the axial ends of the metal part 2. This elevated portion 2A is brought into locking abutment with the tapered faces 3g of the locking projections 3e at the axial ends 3h of the resin part 3.

The position of center of gravity of the conventional weight, which is made of only tungsten, lies in a position in the vicinity of the center axis of the shaft hole, whereas the position of center of gravity of the weight in which the metal part is locked on the resin part is shifted improvably to a position, which lies apart from the axis center of the shaft hole to be in the vicinity of where the resin part is in abutment with the metal part.

By this improvement in position with respect to the center of gravity of the weight, the position of center of gravity can be shifted to the position which is spaced apart from the axis center of the shaft hole 3c by such a length as to obtain a necessary rotational moment.

Since a suppressing function to suppress a radial load resulting when vibration is generated during normal rotation of the vibration motor weight employing the tapered arc-shaped locking projections becomes the same as a suppressing function to suppress a radial impact which is imparted to the tapered arc-shaped locking projections as is shown in FIGS. 1E and 1F, a description which will be made hereinbelow with respect to a radial impact force should be understood as describing the suppression of the aforesaid radial load.

An axial impact force will be described.

As is shown in FIG. 1C, when an impact force F1 is applied in the axial direction, as is shown in FIG. 1D, the impact force transmitted to the elevated portion 2A is dispersed over a wide range on the whole surface of the tapered face 3g and hence is received as small impact forces 2F. Because of this, the value of an impact force per unit area of the tapered face 3g becomes small, thereby making it possible to suppress quite a large magnitude of impact force.

Next, a radial impact force will be described.

As is shown in FIG. 1E, when a radial impact force F3 is applied to the weight, mainly to the metal part 2, as is shown in FIG. 1F, the impact force is received as small impact forces 4F at the two side faces 3j of each of the pair of locking projections 3e of the resin part 3 via the recessed lateral faces 2d of the corresponding locking recesses 2b of the metal part 2. Since the engagement between the recessed lateral faces 2d of the locking recesses 2b and the side faces 3j of the corresponding locking projections 3e is strong and rigid, the radial impact force 3F is made to be suppressed by the cut-off faces 3j of the resin part 3.

Next, an impact force will be described which is applied in a direction which is orthogonal to the axial direction and the radial direction (hereinafter, as a matter of conveniences, referred to as an orthogonal direction).

As is shown in FIG. 1G, when an impact force F5 is applied to the weight, mainly to the metal part 2 in the orthogonal direction, as is shown in FIG. 1H, the impact force F5 is received as small impact forces F6 at the two side faces 3j of each of the pair of locking projections 3e of the resin part 3 via the recessed lateral faces 2d of the corresponding locking recesses 2b of the metal part 2. Since the engagement between the recessed lateral faces 2d of the locking recesses 2b and the side faces 3j of the corresponding locking projections 3e is strong and rigid, the radial impact force F5 is made to be suppressed by the cut-off faces 3j of the resin part 3.

Second Embodiment

FIGS. 2A-2H show explanatory diagrams showing configurations of a weight for a vibration motor according to a second embodiment, which employs edged arc-shaped locking projections.

Figure 2A:
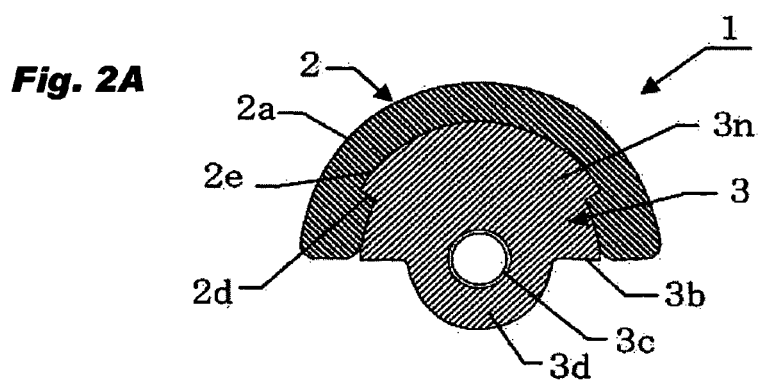
FIGS. 2A-2H are explanatory diagrams showing configurations of a vibration motor weight which employs edged locking projections.
Figure 2B:
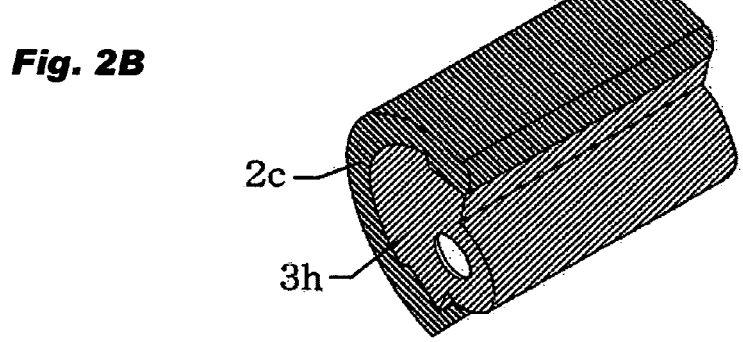

FIG. 2A is a side view of the vibration motor weight employing the edged arc-shaped locking projections when viewed in an axial direction, FIG. 2B is a perspective view of the same vibration motor weight as viewed from therebelow, and FIGS. 2C-2H are explanatory diagrams explaining impact suppressing functions.

Figure 2C:
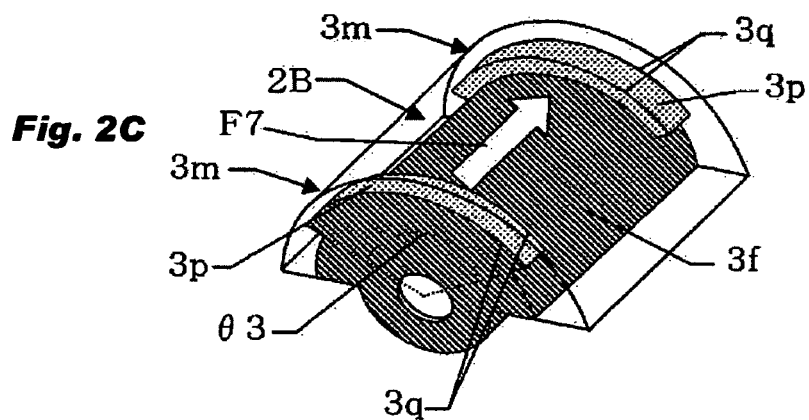
Figure 2D:
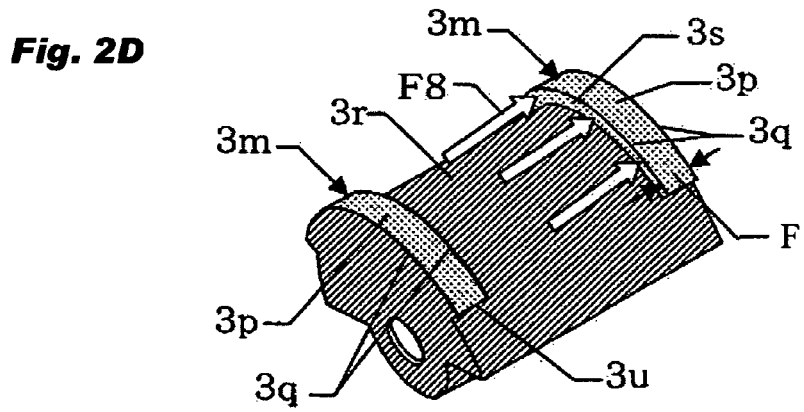

FIG. 2C is an explanatory diagram explaining a case where an axial impact force is being applied to the weight or mainly to a metal part, in which the metal part is shown by solid lines as being transparent. FIG. 2D is an explanatory diagram explaining how a resin part functions to suppress the impact force in FIG. 2C.

Figure 2E:
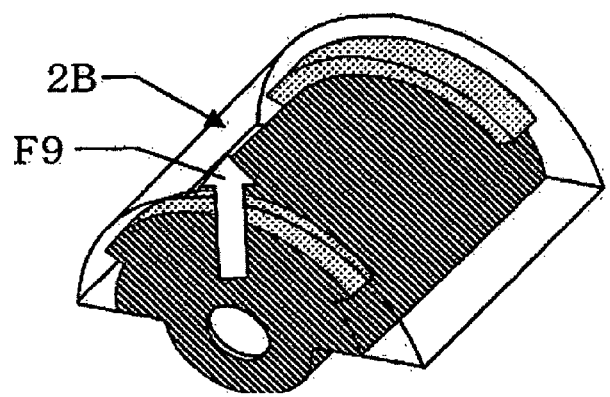
Figure 2F:
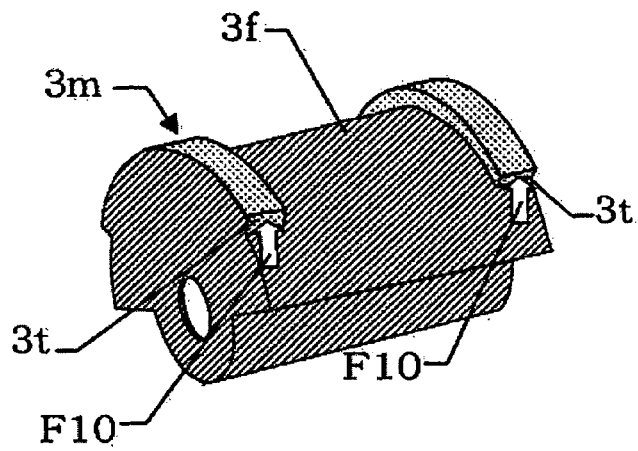

FIG. 2E is an explanatory diagram explaining a case where a radial impact force is being applied similarly to the metal part, in which the metal part is shown by solid lines as being transparent. FIG. 2F is an explanatory diagram explaining how the resin part functions to suppress the impact force in FIG. 2E.

Figure 2G:
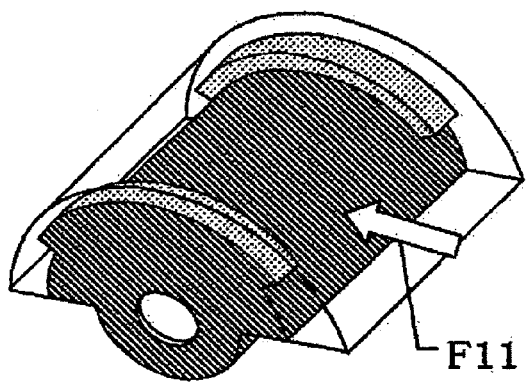
Figure 2H:
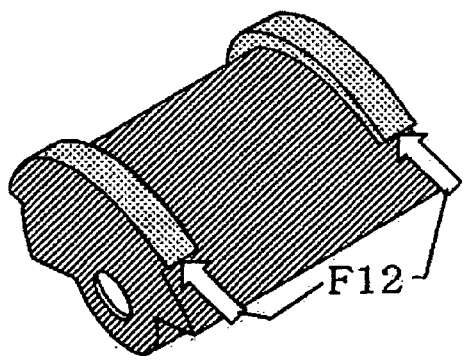

FIG. 2G is an explanatory diagram explaining a case where an impact force is being applied similarly to the metal part in a direction which is orthogonal to the axial direction and the radial direction, in which the metal part is shown by solid lines as being transparent. FIG. 2H is an explanatory diagram explaining how the resin part functions to suppress the impact force in FIG. 2G.

A resin part 3 is formed from a resin having a necessary impact strength and a necessary heat resistance, for example, Genestar® G2330 (made by Kuraray Co., Ltd., Japan) and is configured in such a manner that a semi-tubular portion $3d$ is formed integrally on a flat surface side $3b$ of a semi-cylindrical portion $3n$ in a longitudinal direction in such a manner as to form a shaft hole $3c$ together with the semi-cylindrical portion $3n$ and that locking projections $3m$ are formed integrally at ends of the semi-cylindrical portion $3n$ in an axial direction of the shaft hole $3c$.

The locking projections $3m$ are each formed into an edged arc-shaped locking projection, and as is shown in FIGS. 2C, 2E, 2G which are perspective views of the vibration motor weight with a metal part 2 indicated by solid lines as being transparent and in FIGS. 2D, 2F, 2H which show the resin part 3, the resin part 3 has edged (angled) arc-shaped projecting shapes at ends thereof in the axial direction of the weight. The locking projections $3m$ each include a top surface $3p$ which has a constant radius from an axis center of the shaft hole $3c$, and angles formed by the top surface $3p$ and lateral faces in the axial direction each become a right angle.

The locking projection $3m$ according to the second embodiment has a rectangular cross section as viewed in the axial direction and exhibits the edged arc-shaped projecting shape which extends along an outer circumferential surface of the semi-cylindrical portion $3n$ in a rotational direction centered at the center axis of the shaft hole $3c$ in the semi-cylindrical portion $3n$. Edge means a right-angled corner. Since axial edges $3q$ of the top surface (a radially outermost surface) $3p$ of the edged arc-shaped locking projection ($3m$) are each made into an edge, as a result, angles formed by the outer surface $3f$ of the semi-cylindrical portion $3n$ and lateral faces $3s$ of the edged arc-shaped locking projections ($3m$) (lateral faces which continuously follow the aforesaid "corners") each become a right angle.

Ends in the rotational direction or rotational direction ends of the edged arc-shaped locking projection are made into cut-off faces in the rotational direction or side faces $3t$ which are angled so that locking recesses of the metal part 2 can be locked thereon.

In the embodiment, the lateral faces $3s$ serve as an edged side face connecting the top face $3p$ of each of the locking projections $3m$ and the circumferential face $3f$ of the semi-cylindrical portion $3n$ and formed to be perpendicular to the top face $3p$ and the circumferential face $3f$.

As is shown, for example, in FIG. 2D, the top surface $3p$ which is defined by the edges is provided in the form of a strip-like shape having a predetermined width F measured from each axial end and extending over a predetermined center angle range $\theta 3$ from the center axis. As is shown in FIG. 2A, a center angle $\theta 1$ of the resin part 3 is 180 degrees, and a center angle of the locking projection $3m$ is referred to as an angle which results after an angle twice an angle which corresponds to a length from the flat surface side $3b$ to the cut-off $3t$ on which the locking recess $2e$ of the metal part 2 is locked is deducted from 180 degrees. As is shown in FIGS. 2F and 2H, an axial cross section of the cut-off $3t$ configures a rectangular shape having edges as a result of the configuration of the top surface $3p$.

The angle of the cut-off $3t$ is set to an angle at which the metal part 2 is prevented from being displaced from the resin part 3 even when an impact force is applied to the weight in directions indicated by arrows in FIGS. 2E and 2G, that is, for example, an angle 90 degrees±5 degrees.

Axial surfaces shown in FIG. 2F which are formed at the ends of the locking projections $3m$ in the rotational direction as a cut-off reaching the outer surface $3f$ of the resin part 3 are each referred to as a cut-off face $3t$ of the locking projection $3m$ which is oriented in the rotational direction or the side face $3t$. These side faces $3t$ are provided in four locations in total on the resin part 3, two at each axial end $3h$ of the resin part 3.

The resin part 3 is formed by a resin injection molding technique such as an injection molding technique. Since structurally, end portions $2c$ of the metal part 2 are exposed from the resin part 3, for example, when injection molding a resin part main body 3, the metal part 2 is disposed to be erected within the dies in such a manner that one end portion $2c$ of the metal part contacts a bottom surface within the dies, and a resin is injected into the dies in such a state. The resin thus injected comes to stay on an inside of the metal part 2 and is then allowed to set there. Because of this, in the weight according to the embodiment, since the end portions $2c$ of the metal part 2 are level with the corresponding end faces of the resin part 3, the manufacturing system and manufacturing process can be made easy and simple.

The metal part 2 is made of a material having a high specific gravity such as, particularly, tungsten (W) or lead (Pb). The metal part 2 is formed in such a manner as to cover the resin part 3 in the radial direction and its radial outer surface is formed into the tubular surface $2a$. The locking recesses $2b$ of the metal part 2 are configured in such a way as to be combined with the corresponding locking projections $3e$ of the resin part 3. The locking recess $2e$ has recessed lateral faces $2d$ which are brought into engagement with the side faces $3t$ of the corresponding locking projection $3m$.

An elevated portion 2B is provided between the locking recesses $2e$ at the axial ends of the metal part 2. This elevated portion 2B is brought into locking abutment with lateral faces $3s$ of the locking projections $3m$ at the axial ends $3h$ of the resin part 3.

The position of center of gravity of the conventional weight which is made of only tungsten lies in a position in the vicinity of the center axis of the shaft hole, whereas the position of center of gravity of the weight of the invention in which the metal part is locked on the resin part is shifted improvably to a position which lies apart from the axis center of the shaft hole to be in the vicinity of where the resin part 3 is in abutment with the metal part 2.

By this improvement in position with respect to the center of gravity of the weight, the position of center of gravity can be shifted to the position which is spaced apart from the axis center of the shaft hole 3c by such a length as to obtain a necessary rotational moment.

Since a suppressing function to suppress a radial load resulting when vibration is generated during normal rotation of the vibration motor weight employing the edged arc-shaped locking projections becomes the same as a suppressing function to suppress a radial impact which is imparted to the edged arc-shaped locking projections as is shown in FIGS. 2E and 2F, a description which will be made hereinbelow with respect to a radial impact force should be understood as describing the suppression of the aforesaid radial load.

An axial impact force will be described.

As is shown in FIG. 2C, when an impact force is applied in the axial direction, as is shown in FIG. 2D, the impact force is received as small impact forces 8F which are dispersed over a wide range on the whole lateral face 3s of the locking projection 3m via the elevated portion 2B of the metal part 2. Because of this, the value of an impact force per unit area of the lateral face 3s of the locking projection 3m becomes small, thereby making it possible to suppress quite a large magnitude of impact force.

Next, a radial impact force will be described.

As is shown in FIG. 2E, when a radial impact force F9 is applied to the weight, mainly to the metal part 2, as is shown in FIG. 2F, the impact force 9F is received as small impact forces 10F at the two side faces 3t of each of the pair of locking projections 3m of the resin part 3 via the recessed lateral faces 2d of the corresponding locking recesses 2e of the metal part 2. Since the engagement between the recessed lateral faces 2d of the locking recesses 2e and the side faces 3t of the corresponding locking projections 3e is strong and rigid, the radial impact force 9F is made to be suppressed by the cut-off faces 3t of the resin part 3.

Next, an impact force will be described which is applied in a direction which is orthogonal to the axial direction and the radial direction (hereinafter, as a matter of conveniences, referred to as an orthogonal direction).

As is shown in FIG. 2G, when an impact force F11 is applied to the weight, mainly to the metal part 2 in the orthogonal direction, as is shown in FIG. 2H, the impact force F11 is received as small impact forces F12 at the two side faces 3t of each of the pair of locking projections 3m of the resin part 3 via the recessed lateral faces 2d of the corresponding locking recesses 2e of the metal part 2. Since the engagement between the recessed lateral faces 2d of the locking recesses 2e and the side faces 3t of the corresponding locking projections 3m is strong and rigid, the radial impact force F11 is made to be suppressed by the cut-off faces 3t of the resin part 3.

Third Embodiment

FIGS. 3A-3E show explanatory diagrams showing configurations of a weight for a vibration motor according to a third embodiment, which employs T-shaped locking projections.

Figure 3A:
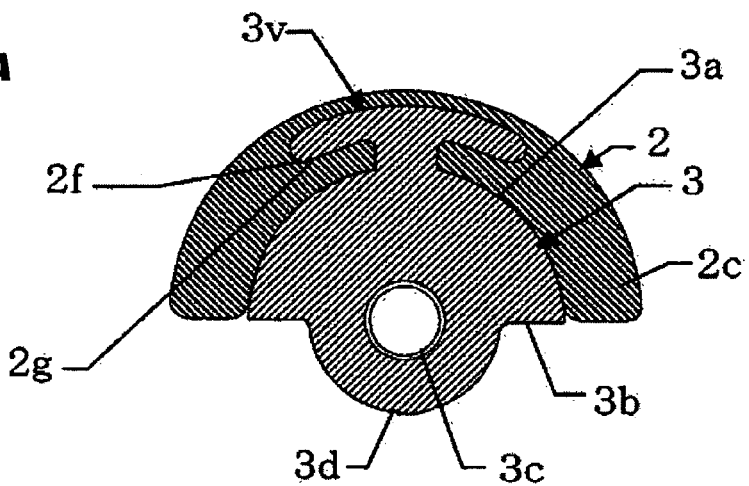
FIGS. 3A-3E are explanatory diagrams showing configurations of a vibration motor weight which employs T-shaped locking projections.
Figure 3B:
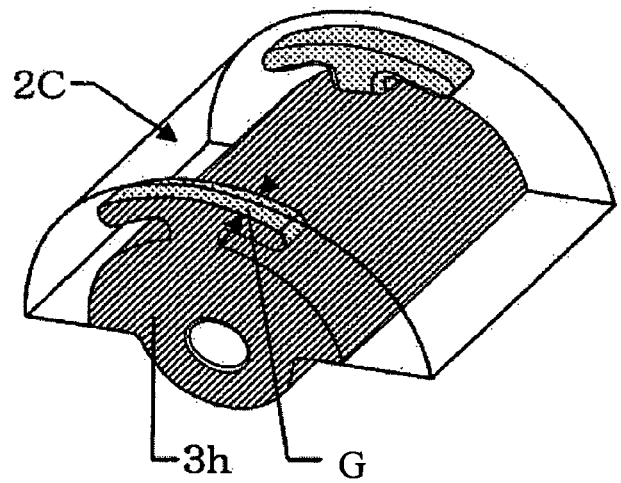
Figure 3C:
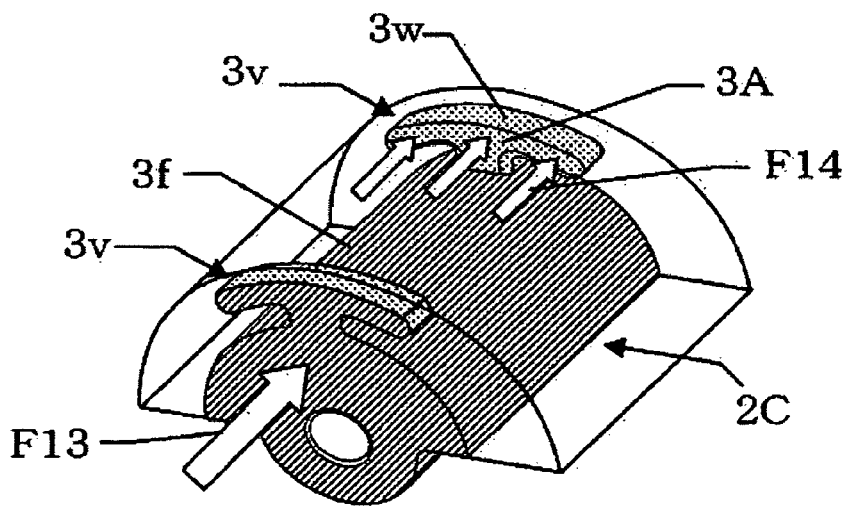
Figure 3D:
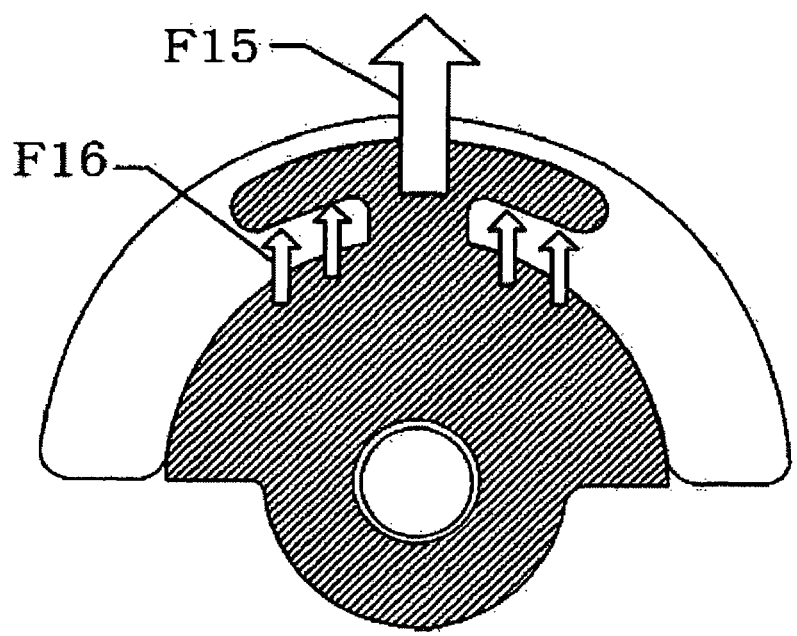
Figure 3E:
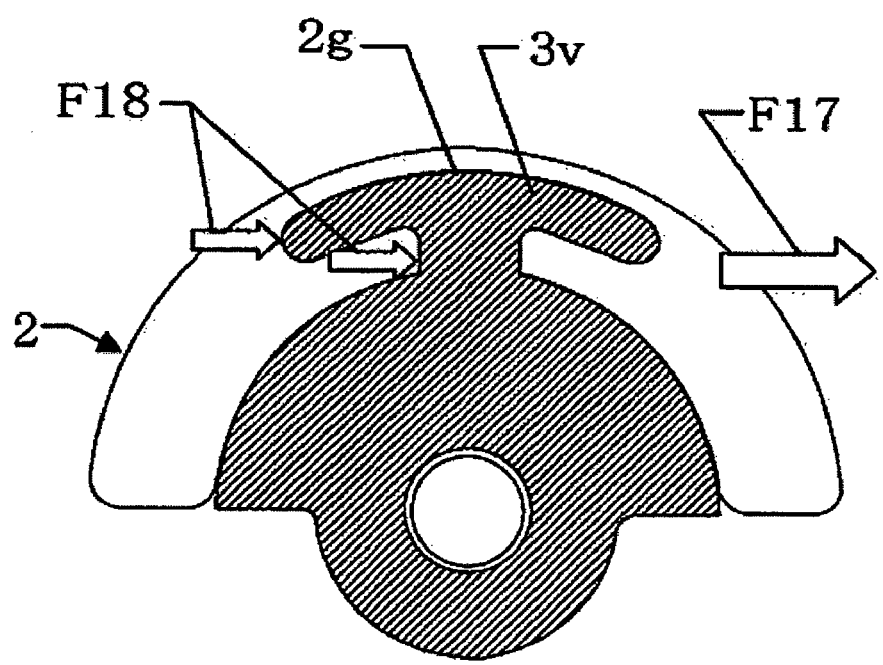

FIG. 3A is a side view of the vibration motor weight when viewed in an axial direction, FIG. 3B is a perspective view of the same vibration motor weight, and FIGS. 3C-3E are explanatory diagrams explaining impact suppressing functions.

FIG. 3C is an explanatory diagram explaining a function to suppress an axial impact force by a resin part when such an axial impact force is applied to the weight or mainly to a metal part, with the metal part shown by solid lines as being transparent.

FIG. 3D is an explanatory diagram explaining a function to suppress a radial impact force by the resin part when such a radial impact force is applied to the metal part, with the metal part shown by solid lines as being transparent.

FIG. 3E is an explanatory diagram explaining a function to suppress an impact which is applied in a direction which is orthogonal to the radial direction and the axial direction by the resin part when such an impact force is applied to the metal part, with the metal part shown by solid lines as being transparent.

Each of locking projections 3v according to the third embodiment exhibit a T-shaped projecting shape which has a rectangular cross section as viewed in an axial direction and projects radially from an axial end 3h of a semi-cylindrical portion 3a. A horizontal bar portion of the T-shape is formed into an arc-like shape. Angles formed by a top surface (a radially outermost surface) 3w of the T-shaped locking projections (3v) and axial lateral faces 3A each become a right angle. As a result, angles formed in the axial direction by an outer surface 3f of the semi-cylindrical portion 3a and the lateral faces 3A of the T-shaped locking projections (3v), that is, axially formed angles become a right angle.

In the embodiment, each of the locking projections 3v is formed to have a T-shape having a base portion extending from the circumferential face 3f of the semi-cylindrical portion 3a and a pair of lateral portions extending outward from the base portion along the circumferential face 3f.

The resin part 3 is formed from a resin having a necessary impact strength and a necessary heat resistance, for example, Genestar® G2330 (made by Kuraray Co., Ltd., Japan) and is configured in such a manner that a semi-tubular portion 3d is formed integrally on a flat surface side 3b of the semi-cylindrical portion 3a in a longitudinal direction in such a manner as to form a shaft hole 3c together with the semi-cylindrical portion 3a and that locking projections 3v are formed integrally at axial ends of the semi-cylindrical portion 3a.

The locking projections 3v are each formed into the T-shaped locking projection, and as is shown in FIGS. 3B and 3C which are perspective views of the vibration motor weight with the metal part 2 indicated by solid lines as being transparent and in FIGS. 3D and 3E which shows the resin part 3, the resin part 3 has edged (angled) arc-shaped projecting shapes at ends thereof in the axial direction of the weight. The locking projections 3v each include a top surface which has a constant radius from an axis center of the shaft hole 3c, and angles formed by the top surface and lateral faces in the axial direction each become a right angle.

As is shown, for example, in FIG. 3C, the top surface 3w which is defined by the edges is provided in the form of a strip-like shape having a predetermined width measured from each axial end 3h and extending in a rotational direction. As is shown in FIG. 3A, a center angle of the resin part 3 is 180 degrees, and a center angle of a portion thereof which is occupied by a vertical bar of the T-shape is referred to as an angle which can somehow resist an impact force imparted to the metal part. As is shown in FIG. 3D, 3E, the T-shaped portion has a rectangular axial cross section corresponding to a location thereon in the rotational direction.

As is shown in FIGS. 3D and 3E, the horizontal bar of the T-shape is formed in such a manner that a radius from the center axis becomes constant as viewed in the side views.

In the T-shaped locking projections 3v, dimensions and angles of respective portions are set to values with which the metal part 2 is prevented from being displaced from the resin part 3 even when impact forces F13, F15, F17 are imparted to the weight in directions indicated by arrows in FIGS. 3C, 3D and 3E.

The resin part 3 is formed by a resin injection molding technique such as an injection molding technique. Since structurally, end portions 2c of the metal part 2 are exposed from the resin part 3, for example, when injection molding a resin part main body 3, the metal part 2 is disposed to be erected within the dies in such a manner that one end portion 2c of the metal part 2 contacts a bottom surface within the dies, and a resin is injected into the dies in such a state. The resin so injected comes to stay on an inside of the metal part 2 and is then allowed to set there. Because of this, in the weight according to the embodiment, since the end portions 2c of the metal part 2 are level with the corresponding end faces of the resin part 3, the manufacturing system and manufacturing process can be made easy and simple.

The metal part 2 is made of a material having a high specific gravity such as, particularly, tungsten (W) or lead (Pb). The metal part 2 is formed in such a manner as to cover the resin part 3 in the radial direction and its radial outer surface is formed into the tubular surface 2a. Locking recesses 2f of the metal part 2 are configured in such a way as to be combined with the corresponding locking projections 3v of the resin part 3.

An elevated portion 2C is provided between the locking recesses 2f at the axial ends of the metal part 2. This elevated portion 2C is brought into locking abutment with lateral faces 3A of the T-shaped locking projections 3v at the axial ends 3h of the resin part 3.

The locking recess 2f has a T-shaped opening 2g which is brought into engagement with the T-shaped portion of the corresponding locking projection 3v.

The position of center of gravity of the conventional weight which is made of only tungsten lies in a position in the vicinity of the center axis of the shaft hole, whereas the position of center of gravity of the weight of the invention in which the metal part 2 having the T-shaped openings 2g is locked on the resin part 3 having the T-shaped locking projections 3v is shifted improvably to a position which lies apart from the axis center of the shaft hole 3c to be in the vicinity of where the resin part 3 is in abutment with the metal part 2.

By this improvement in position with respect to the center of gravity of the weight, the position of center of gravity can be shifted to the position which is spaced apart from the axis center of the shaft hole 3c by such a length as to obtain a necessary rotational moment.

Since a suppressing function to suppress a radial load resulting when vibration is generated during normal rotation of the vibration motor weight employing the T-shaped locking projections becomes the same as a suppressing function to suppress a radial impact which is imparted in a direction shown in FIG. 3D, a description which will be made hereinbelow with respect to a radial impact force should be understood as describing the suppression of the aforesaid radial load.

An axial impact force will be described.

As is shown in FIG. 3C, when an impact force F13 is applied in the axial direction, the impact force is received as small impact forces 14F which are dispersed over a wide range on the whole lateral face 3A of the locking projection 3v via the elevated portion 2B of the metal part 2. Because of this, the value of an impact force per unit area of the lateral face 3A of the T-shaped locking projection (3v) becomes small, thereby making it possible to suppress quite a large magnitude of impact force.

Next, a radial impact force will be described.

As is shown in FIG. 3D, when a radial impact force F15 is applied to the weight, mainly to the metal part 2, the impact force is received by the T-shaped locking projection (3v) of the resin main body 3 via a lower surface of the T-shaped opening 2g. Since the engagement between the lower surface of the T-shaped opening 2g and a radial surface of the T-shaped locking projection (3v) is strong and rigid, the radial impact force so applied is suppressed by the T-shaped locking projection portion (3v) of the resin part 3.

Next, an impact force will be described which is applied in a direction which is orthogonal to the axial direction and the radial direction (hereinafter, as a matter of conveniences, referred to as an orthogonal direction).

As is shown in FIG. 3E, when an impact force F17 is applied to the weight, mainly to the metal part 2 in the orthogonal direction, the impact force is received by the T-shaped locking projection (3v) of the resin main body 3 via a lateral face of the T-shaped opening 2g of the metal part 2. Since the engagement between the lateral face of the T-shaped opening 2g and an orthogonal surface of the T-shaped locking projection (3v) is strong and rigid, the orthogonal impact force thus applied is suppressed by the T-shaped locking projection portion of the resin part 3.

Next, impact force resistant characteristics of the weight for a vibration motor according to the embodiments will be described.

In the following description, it is assumed that the weights according to the first to the third embodiments are prepared having the following particulars of (a)-(c).

(a) Weights according to the first embodiment, in which the tapered arc-shaped locking projections are employed, are prepared. The weights according to this group has the following dimensions (refer to FIG. 1A). L1 is 2.30 mm, L2 is 1.75 mm, and L3 is 1.50 mm. The taper angle is 26 degrees, and the width of the taper portion is 0.5 mm. As is shown in FIG. 1C, the taper angle is referred to as the rising angle θ of the taper portion when the shaft direction of the outer surface of the metal part 2 is regarded as a base.

(b) Weights according to the second embodiment, in which the edged arc-shaped locking projections are employed, are prepared. The weights according to this group has the following dimensions (refer to FIG. 2A). L1 is 2.30 mm, L2 is 1.75 mm, and L3 is 1.50 mm. The axial width of the projecting portion is 0.43 mm. The length measured radially from the center axis of the shaft hole to the outer surface of the metal part is referred to as L1, the length measured similarly to the top surface of the locking projection as L2, and the length measured similarly to the outer surface of the axially central portion of the resin part as L3.

(c) Weights according to the third embodiment, in which the T-shaped locking projections being employed, are prepared. The weight according to this group has the following dimensions (refer to FIG. 3A). L1 is 2.30 mm, L2 is 1.75 mm, and L3 is 1.50 mm. The axial width of the projecting portion is 0.43 mm. The length measured radially from the center axis of the shaft hole to the outer surface of the metal part is referred to as L1, the length measured similarly to an inner surface of the horizontal bar of the T-shape of the T-shaped locking projection as L2, and the length measured similarly to the outer surface of the axially central portion of the resin part as L3.

The impact force resistant characteristics of the weight employing the tapered arc-shaped locking projections, which is considered as having a lowest impact force resistant characteristic in the weights of three types, are be simulated.

Conditions for measuring an impact force to be applied are the following (1)-(3).

(1) A vibration motor equipped with the vibration motor weight of the invention is fitted in a mobile telephone, and an impact is to be measured which results when the mobile phone is caused to fall in a natural fashion from a height of 1 m.

(2) A vibration motor of rubber type is used as the vibration motor placed in the mobile phone, and an impact applied to the weight is set to 5000 G.

An impact that is actually applied to the weight under these conditions becomes as will be described later.

(3) Genestar® G2330 (made by Kuraray Co., Ltd., Japan) is used as the material of the resin part, and tungsten is used as the material of the metal part.

A measurement made under these conditions will result as shown in Table 1 below.

TABLE 1

| | Weight of the weight (g) | Impact applied to the weight (N) 5000 G |
|---|---|---|
| Sample 1 | 0.385 | 18.9 |

It is concluded from the result of the measurement that when the impact of 5000 g is applied to the weight of 0.385 g, an impact of 18.9 N is applied to the metal part. Herein, the impact (N: newton) applied to the weight is defined as below.

Impact=weight of the weight(kg)×impact($G$)×9.8(m/s$^2$)

Analyzing conditions for analyzing the impact data above will be as below.

(1) ANSYS Workbench Products 8.1 (made by CYBERNET SYSTEM Co., Ltd., Japan) is used as analyzing software.

(2) Genestar® G2330 (made by Kuraray Co., Ltd., Japan) is used as the resin which is used in the weight.

(3) Physical properties of the resin described under the item (2) are as follows: Young's modulus: 10280 MPa; Poisson's ratio: 0.37; Density: 1680 kg/m$^3$ (4) Directions of load are as follows:
(4a) Direction in which the metal part is displaced (axial direction); and
(4b) Radial direction.

A stress will be such as shown in Table 2 below which is applied to the rein main body part of the weight when an impact of 5000 g is imparted to the weight.

TABLE 2

| | | | Stress (MPa) | |
|---|---|---|---|---|
| (Resin main body part) | Impact (G) | Load to the weight (N) | axial direction | radial direction |
| Sample 1 | 5000 G | 18.9 N | 43.4 | 355.8 |

According to the results of the analysis, assuming that the impact applied to the weight is 5000 G and the impact is applied to the weight in (4a) in the direction in which the metal part is displaced (the longitudinal direction of the shaft) and in (4b) the radial direction, stresses applied to the resin part then becomes 43.4 MPa in the axial direction and 355.8 MPa in the radial direction.

The result is that since the strength of the resin of Sample 1, which is Genestar® G2330 (made by Kuraray Co., Ltd., Japan), is 222 MPa, although the resin of Sample 1 can resist the impact force in the axial direction, the resin cannot resist the impact force in the radial direction. However, since the cut-off portions of the resin part which act as the locking portions are provided in the four locations, the impact force per location becomes one fourth of the radial impact force.

A resulting stress when the radial load applied to each of the cut-off portions of the resin of Sample 1 is one fourth becomes as shown in Table 3 below.

TABLE 3

| (Cut-off) | Impact Applied (G) | Load Applied to each Cut-off (N) | Stress (MPa) radial direction |
|---|---|---|---|
| Sample 1 | 5000 G | 4.7 N | 89.0 |

From the result shown in Table 3, when the four cut-off portions acting as the locking portions, since the radial stress applied to each cut-off portion becomes 89.0 MPa, the stress per cut-off portion becomes far smaller than the 222 MPa, which is the value of strength of the resin of Sample 1, Genestar® G2330 (made by Kuraray Co., Ltd., Japan). Therefore, the impact force can be suppressed sufficiently.

It can be said from the results of the simulations that as long as the conditions described above are maintained, the vibration motor weight of the invention which employs the tapered arc-shaped locking projections has the sufficient impact force resistant characteristics against an anticipated large impact force.

Next, the impact force resistant characteristics of the weight employing the edged arc-shaped locking projections are be simulated.

As is shown in FIGS. 2A-2H, when the edged portions (the angled stepped portions) being used as the support portions for the metal part in place of the tapered portions, since the axial cross section is changed from the triangular shape of the tapered portion to the rectangular shape of the edged portion, the cross sectional area of the edged portion can be increased to twice the cross sectional area of the tapered portion. Namely, the rectangular cross section is cut diagonally along the diagonal line connecting two diagonally confronting corners, the rectangular cross section or shape is divided into two triangles. Because of this, a stress resulting when the impact force is applied becomes one half the stress applied to the tapered locking projection as is shown in Table 4 below.

TABLE 4

| (Stepped portion) | Impact Applied (G) | Load Applied to weight (N) | Stress (MPa) radial direction |
|---|---|---|---|
| Sample 2 | 5000 G | 18.9 N | 177.9 |

As a result, when the load applied to the weight of Sample 2 is 18.9 N, a stress applied to the weight in the radial direction becomes 177.9 MPa, which is smaller than the value of strength of the resin (222 MPa) in the Sample 1, the resin of Genestar® G2330 (made by Kuraray Co., Ltd., Japan). Because of this, since the stress applied to the edged arc-shaped locking projection by the impact force becomes far smaller than 222 MPa which is the value of strength of Genestar® G2330 (made by Kuraray Co., Ltd., Japan), the impact force can be suppressed sufficiently.

In this way, by changing the configuration of the locking projection from the tapered configuration to the edged configuration, the resin locking projection can be made to resist sufficiently the impact force generated when the mobile phone falls.

A relationship between vibration amount and metal utilization amount is studied on the weight of the invention in which the resin part and the metal part are combined so as to be integrated into the single weight and the conventional weight which is made of only tungsten.

As to the weight of the invention, from the viewpoint of standardizing the various parameters in relation to the metal parts which are formed into the different shapes, samples are specified to the weight which employs the tapered arc-shaped locking projections and the weight which employs the edged arc-shaped locking projections, and their configurations are standardized into a wide arc-shaped model shown in FIGS. 4A-4D.

Figure 4A:
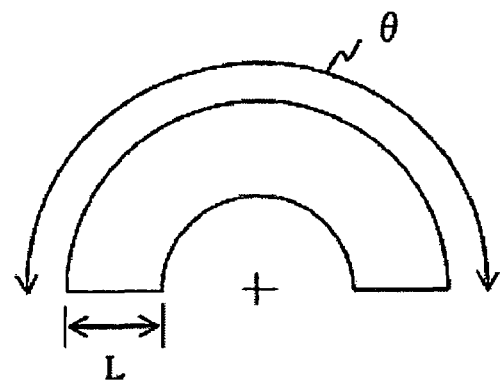
FIGS. 4A-4D are explanatory diagrams showing a wide arc-shaped model.
Figure 4B:
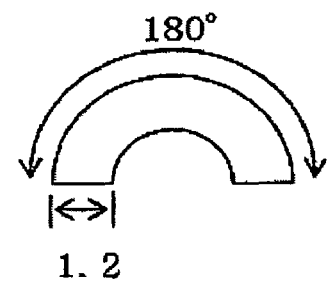
Figure 4C:
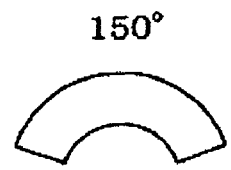
Figure 4D:
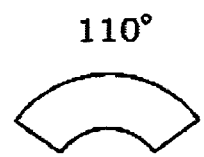

FIGS. 4A-4D shows explanatory diagrams of the wide arc-shaped model. FIG. 4A shows an example in which the center angle θ is fixed to 180 degrees and the width L of the arc is changed. FIG. 4B shows an example in which the center angle θ is fixed to 180 degrees and the width L of the arc is 1.2 mm, FIG. 4C shows an example in which the center angle θ is fixed to 150 degrees and the width L of the arc is 1.2 mm, and FIG. 4D shows an example in which the center angle θ is fixed to 110 degrees and the width L of the arc is 1.2 mm.

In the following description, it is assumed that the vibration amount and respective parameters used to calculate a vibration amount are as below.

Vibration amount $F = mr\omega^2 (N)$ where, m: mass (g);

r: radius of center of gravity (mm);

ω: angular velocity ($2\pi r$) (rad/s); and f: rotational speed/60 (s).

Values of the parameters of the conventional weight are assumed to be as below.

m: 0.684;

r: 0.805;

rotational speed: 9000;

F: 0.49; and specific gravity of the weight: 19.2

Measurement Example 1

An arc-shaped model shown in FIG. 4A is used. The arc-shaped model configures the example in which the center angle θ is 180 degrees and the width L of the arc is a variable L. In order to maintain the integrally molded shape constant, the radial thickness of a resin part changes as the width of the arc of a metal part changes.

Characteristics with respect to vibration amount when the metal part is made of tungsten and the width L of the arc of the metal part is made to change become as shown in Table 5.

TABLE 5

| | Center Angle: 180 degrees, Rotational Speed: 9000 rpm | | | | | |
|---|---|---|---|---|---|---|
| Tungsten | L (variable) (mm) | 0.4 | 0.6 | 0.8 | 1.0 | 1.2 |
| | m1 (g) | 0.20 | 0.29 | 0.36 | 0.45 | 0.49 |
| | r1 (mm) | 1.35 | 1.29 | 1.23 | 1.18 | 1.13 |
| | ω (rad/s) | 942 | 942 | 942 | 942 | 942 |
| | F1 (N) | 0.24 | 0.33 | 0.39 | 0.47 | 0.49 |
| Resin | m2 (g) | 0.037 | 0.031 | 0.025 | 0.020 | 0.016 |
| | r2 (mm) | 0.60 | 0.48 | 0.37 | 0.24 | 0.11 |
| | ω (rad/s) | 942 | 942 | 942 | 942 | 942 |
| | F2 (N) | 0.0197 | 0.0132 | 0.0082 | 0.0043 | 0.0016 |
| Integrally molded weight | F total (N) | 0.259 | 0.345 | 0.401 | 0.475 | 0.493 |

Figure 5A:
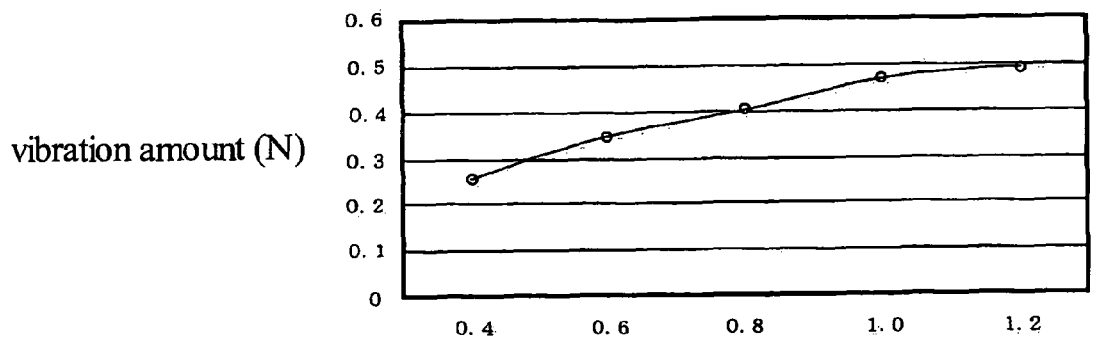
FIGS. 5A-5C are graphs showing characteristics shown in Tables 5 to 7.
Figure 5B:
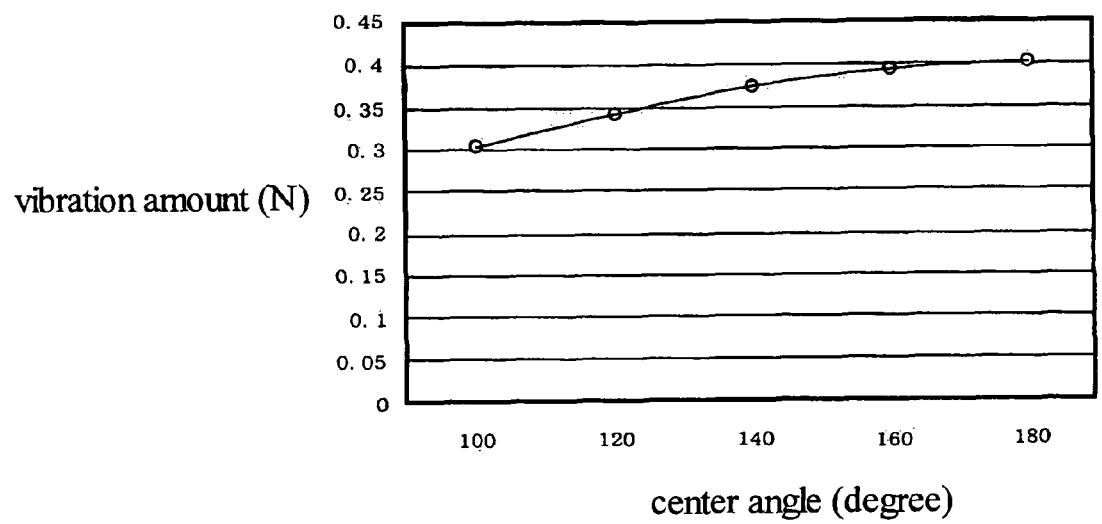
Figure 5C:
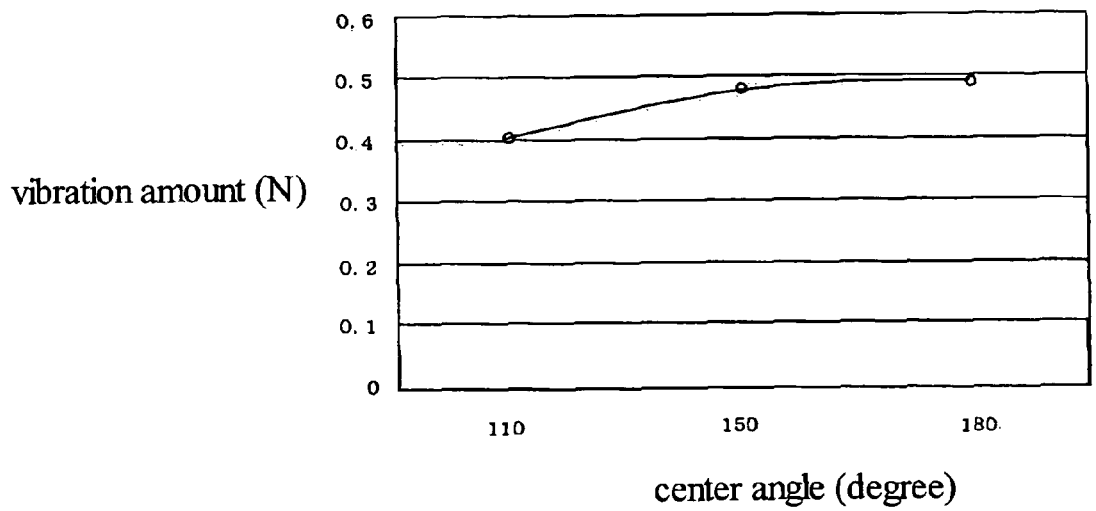

A relationship between the width L (variable) of tungsten and F total of the integrally molded weight shown in Table 5 is shown in FIG. 5A. FIGS. 5A-5C show graphs representing characteristics of Table 5 to Table 7.

It can be said from FIG. 5A that the width L (variable) of tungsten and the vibration amount F total of the integrally molded weight are substantially in a proportional relationship.

Measurement Example 2

The arc-shaped model shown in FIG. 4A is used. The arc-shaped model configures an example in which the width of an arc is 0.8 mm and the center angle θ is a variable. In order to maintain the integrally molded shape constant, the center angle of the resin part changes as the center angle of the metal part changes.

Characteristics with respect to vibration amount when the metal part is made of tungsten and the center angle θ of the metal part is made to change are becomes as shown in Table 6.

TABLE 6

| | Width of Arc of Metal Part: 1.2 mm, Rotational Speed: 9000 rpm | | | | | |
|---|---|---|---|---|---|---|
| Tungsten | Center angle (variable) (degrees) | 100 | 120 | 140 | 160 | 180 |
| | m1 (g) | 0.20 | 0.24 | 0.28 | 0.32 | 0.36 |
| | r1 (mm) | 1.69 | 1.59 | 1.48 | 1.36 | 1.23 |
| | ω (rad/s) | 942 | 942 | 942 | 942 | 942 |
| | F1 (N) | 0.30 | 034 | 0.37 | 0.39 | 0.39 |
| Resin | m2 (g) | 0.014 | 0.017 | 0.019 | 0.022 | 0.025 |

TABLE 6-continued

| Width of Arc of Metal Part: 1.2 mm, Rotational Speed: 9000 rpm | | | | | | |
|---|---|---|---|---|---|---|
| | r2(mm) | 0.045 | 0.40 | 0.36 | 0.35 | 0.37 |
| | ω (rad/s) | 942 | 942 | 942 | 942 | 942 |
| | F2 (N) | 0.0056 | 0.006 | 0.0061 | 0.0068 | 0.0082 |
| Integrally molded weight | F total (N) | 0.306 | 0.345 | 0.374 | 0.393 | 0.401 |

A relationship between the center angle θ of the metal part and vibration amount F total of the integrally molded weight shown in Table 6 is shown in FIG. 5B.

It can be said from FIG. 5B that the center angle θ (variable) and the vibration amount F total of the integrally molded weight are substantially in a proportional relationship.

Measurement Example 3

The arc-shaped models shown in FIGS. 4B, 4C and 4D are used. These arc-shaped models configure an example in which the width of the arc is 1.2 mm and the center angle is a variable. In order to maintain constant the shape of the integrally molded weight, the center angle of the resin main body is made to change as the center angle of the metal part changes.

Characteristics with respect to variation amount when the metal part is made of tungsten and the center angle θ of the metal part is made to change become as shown in Table 7.

TABLE 7

| Width of Arc of Metal Part: 1.2 mm, Rotational Speed: 9000 rpm | | | | |
|---|---|---|---|---|
| | | Center angle (variable) (degrees) | | |
| | | 110 | 150 | 180 |
| Tungsten | m1 (g) | 0.30 | 0.41 | 0.49 |
| | r1 (mm) | 1.51 | 1.31 | 1.13 |
| | ω (rad/s) | 942 | 942 | 942 |
| | F1 (N) | 0.40 | 0.48 | 0.49 |
| Resin | m2 (g) | 0.0098 | 0.0133 | 0.0160 |
| | r2(mm) | 0.43 | 0.36 | 0.11 |
| | ω (rad/s) | 942 | 942 | 942 |
| | F2 (N) | 0.0037 | 0.0042 | 0.0061 |
| Integrally molded weight | F total (N) | 0.406 | 0.481 | 0.493 |

A relationship between the center angle θ (variable) of the metal part and vibration amount F total of the integrally molded weight shown in Table 7 is shown in FIG. 5C.

It can be said from FIG. 5C that the center angle θ (variable) of the metal part and vibration amount F total of the integrally molded weight are substantially in a proportional relationship.

Summary of Results of Measurements

Lastly, in the measured data in the measurement examples 1 to 3 described above, vibration amount F and mass m1 of the metal part (tungsten) are compared with those of the conventional examples and the results of the comparison are shown in Table 8 below.

The tungsten amount (g) in Table 8 is a tungsten amount (g)=(the amount of tungsten in the metal part of the integrally molded weight of the invention)/(the amount of tungsten in the conventional weight which is made of only tungsten), which is represented in percent. When the tungsten amount of the integrally molded weight is reduced based on the tungsten amount of the conventional example, a minus sign, "−", is put before numbers in percent.

Similarly, the vibration amount in Table 8 is a vibration amount (N)=(the vibration amount of the integrally molded weight of the invention)/(the vibration amount of the conventional weight the whole of which is made of tungsten), which is represented in percent. When the vibration amount of the integrally molded weight is reduced based on the vibration amount of the conventional example, a minus sign, "−", is put before numbers in percent.

TABLE 8

| | Center angle θ (variable) (degrees) | | |
|---|---|---|---|
| | 110 | 150 | 180 |
| Tungsten amount (g) | −56% | −40% | −28% |
| Vibration amount (N) | −18% | −2% | 0% |

Figure 6:
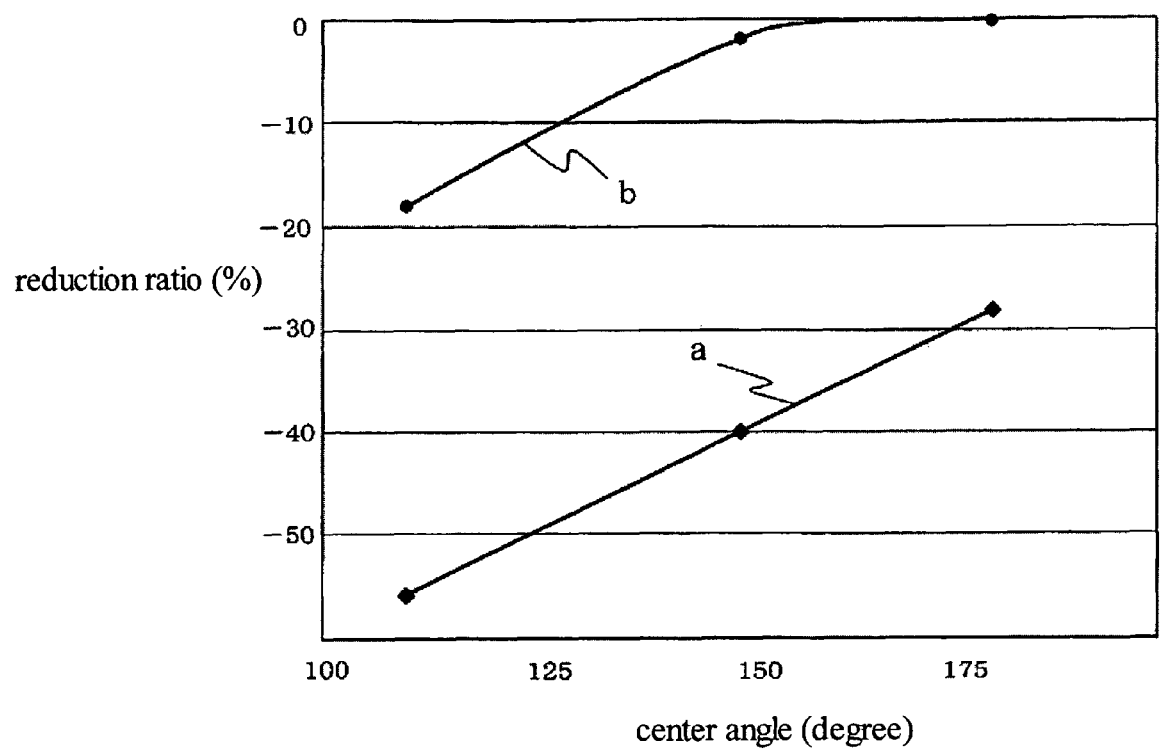
FIG. 6 is a graph representing characteristics shown in Table 8.

FIG. 6 shows a graph which represents the characteristics shown in Table 8.

It can be said from FIG. 6 that the results of the comparison of the tungsten amounts in the metal arts are substantially in a proportional relationship as is shown as characteristic a in is FIG. 6. The results of the comparison of the vibration amounts are shown as characteristic b in FIG. 6.

When the center angle θ is 180 degrees, the vibration amount of the weight of the invention remains the same as that of the conventional example while the utilization amount of tungsten is reduced by 28%. In addition, when the center angle θ is 150 degrees, the vibration amount of the weight of the invention is reduced only by 2% from that of the conventional example, while the utilization amount of tungsten is reduced by as much as 40%. Consequently, it is seen from these facts that with the center angle θ ranging from 150 degrees or more to 180 degrees or less, the weight of the invention is largely advantageous over the conventional example.

Other Embodiments

FIGS. 7A-7F show diagrams illustrating configurations of modified examples of the first to third embodiments, in which the locking configuration between a metal part and a resin part is inversed.

Figure 7A:
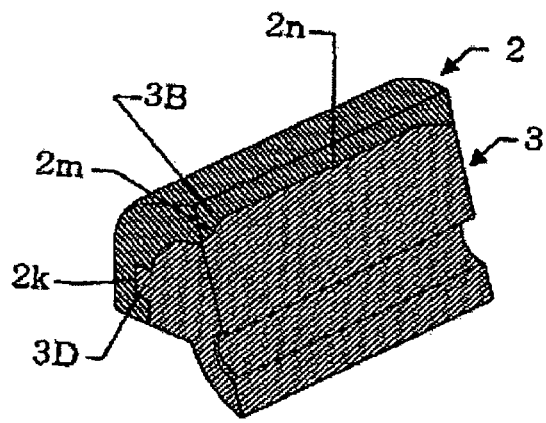
FIGS. 7A-F are diagrams showing configurations of modified examples to first to third embodiments of the invention, in which locking configurations between a metal part and a resin part are inversed.
Figure 7B:
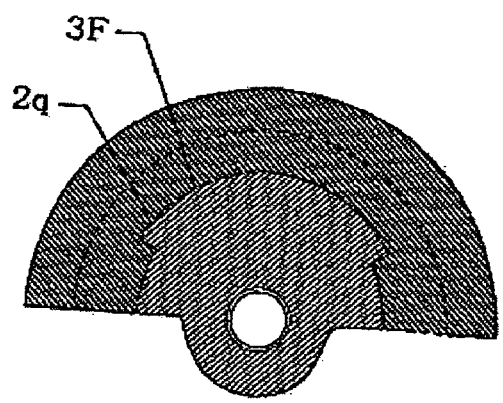
Figure 7C:
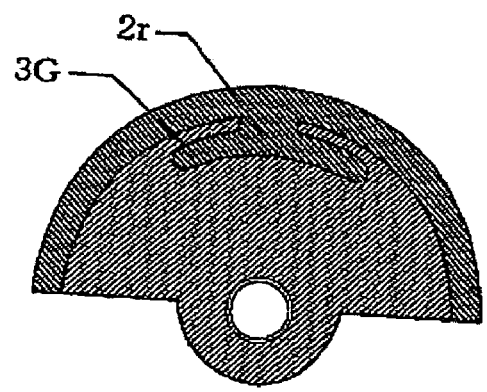
Figure 7D:
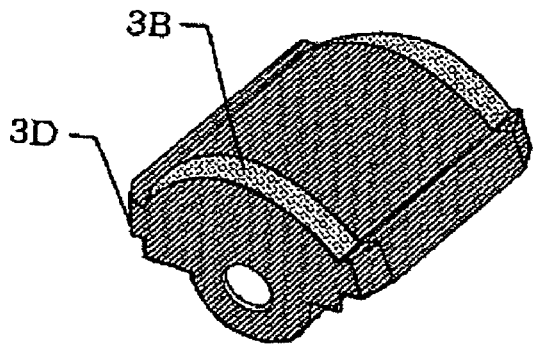

FIGS. 7A and 7D show a modified example to the weight which employs the tapered arc-shaped locking projections, of which FIG. 7A is an axial sectional view of the weight and FIG. 7D is a perspective view of a resin part.

Figure 7E:
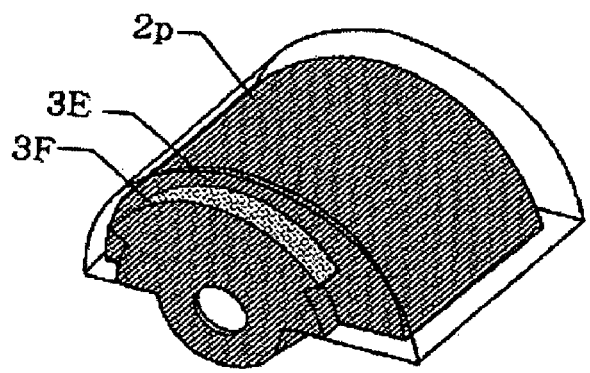

FIGS. 7B and 7E show a modified example to the weight which employs the edged arc-shaped locking projections, of which FIG. 7B is a side view of the weight and FIG. 7E is a perspective view of a weight with a metal part indicated by solid lines as being transparent.

Figure 7F:
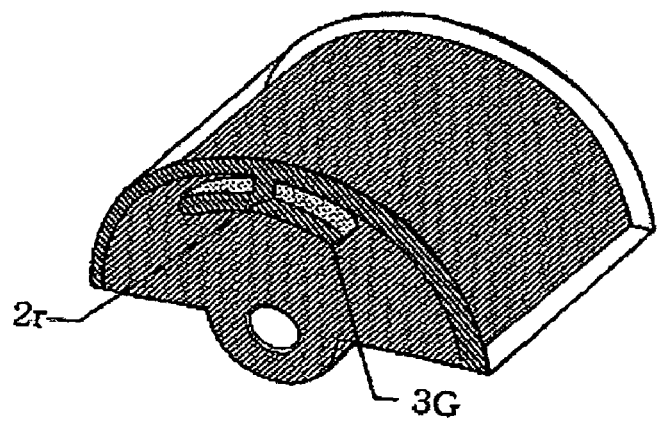
Figure 8A:
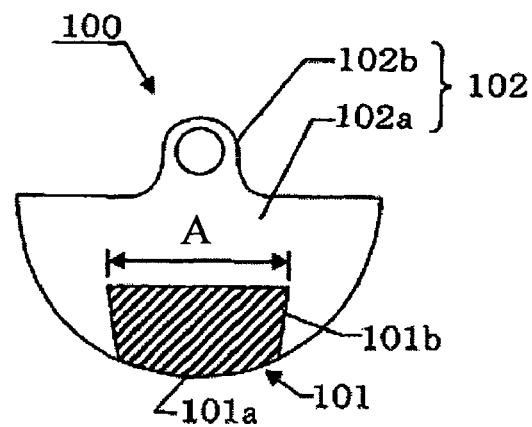
FIGS. 8A-8E are drawings showing configurations of vibration eccentric weights disclosed in JP-A-9-182363.
Figure 8B:
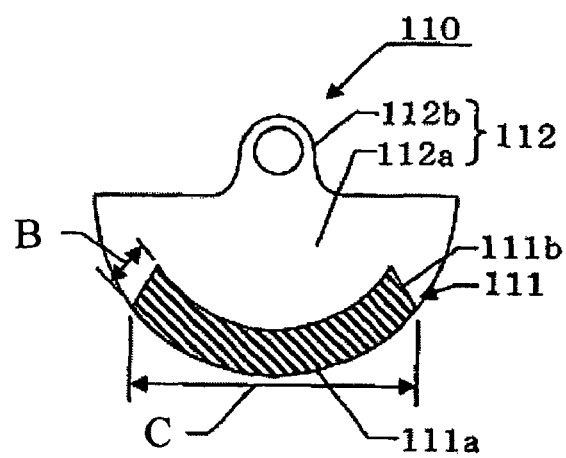
Figure 8C:
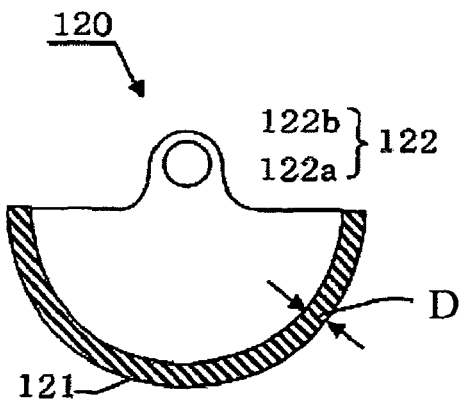
Figure 8D:
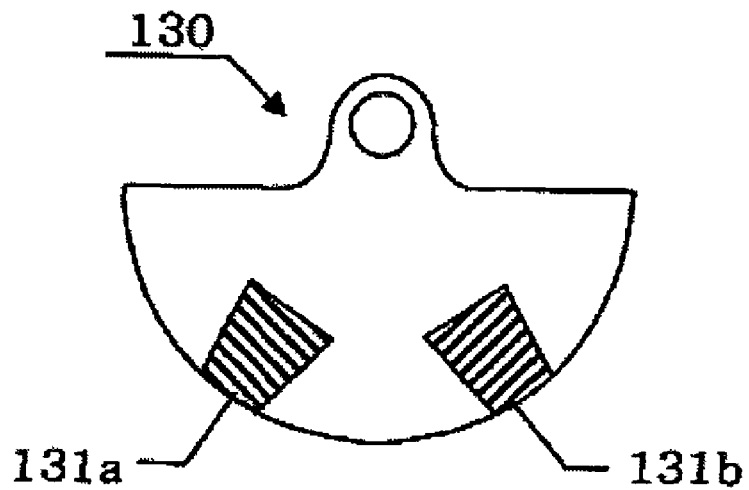
Figure 8E:
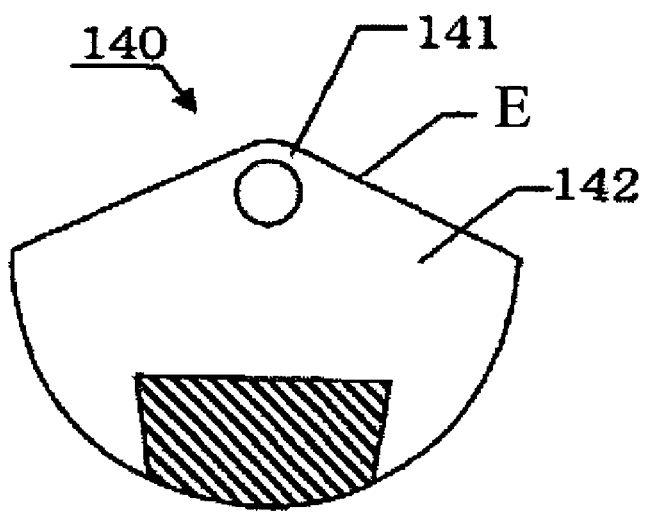

FIGS. 7C and 7F show a modified example to the weight which employs the T-shaped locking projections, of which FIG. 7A is an axial sectional view of the weight and FIG. 7D is a perspective view of a weight with a metal part indicated by solid lines as being transparent.

In the modified example to the weight which employs the tapered arc-shaped locking projections, tapered faces are formed in such a manner as to be inclined in a reverse direction to that shown in FIG. 1C and an elevated portion is also formed in such a manner as to project in a reverse direction to the direction in the same figure, and a metal part 2 and a resin part 3 are configured in such a manner as to be locked together by axial recessed grooves 2k on the metal part 2 and elongated projections 3D on the resin part 3.

The modified example will be described specifically below. Firstly, tapered faces 3B are provided at axial ends of the resin main body 3 in such a manner that a radius from an axis center is increased as they extend from the respective axial ends towards the center of the resin part 3. The tapered faces 3B are represented as reverse tapered faces, and as is shown in FIG. 7D, are provided in the form of a strip-like shape which has a predetermined width as measured from the respective axial ends and extend over a predetermined center angle range from the axis center in a rotational direction. In addition, the elongated projections 3D are provided at ends of the resin part 3 in the rotational direction in such a manner as to extend in an axial direction. The elongated projection 3D is preferably formed into a rectangular shape as viewed from the side.

Reverse tapered faces 2m, which are combined with the reverse tapered faces and which has the same inclination as that thereof, are formed at axial ends of the metal part 2. In addition, the axial recessed grooves 2k are provided in the vicinity of ends of the metal part 2 in the rotational direction.

The reverse tapered faces 2m and 3B of the metal part 2 and the resin part 3 are brought into abutment with each other in the axial direction, so as to suppress an impact force in the axial direction in which the reverse tapered faces 3B of the resin part 3 are added to the reverse tapered faces 2m of the metal part 2.

The elongated projections 3D of the resin part 3 are brought into linear engagement with the recessed grooves 2k of the metal part 2, so as to suppress impact forces which are applied to the metal part in a radial direction and in an orthogonal direction.

In the modified example to the weight which employs the edged arc-shaped locking projections, edges and an elevated portion are formed in reverse directions to the directions shown in FIG. 2C, and an engagement configuration is adopted in which locking recesses which are provided at axial ends of a metal part in such a manner as to extend in a rotational direction and locking projections which are provided at axial ends of a resin part 3 in such a manner as to extend in the rotational direction are brought into engagement with each other.

The modified example to the weight which employs the edged arc-shaped locking projections will be described specifically. While in the configuration shown in FIG. 2C, the locking projections 3m are provided at the axial ends of the resin part 3 while extending in the rotational direction in such a manner as to project from the outer surface of the main body part 3, in the modified example, as is shown in FIG. 7E, locking projections 3F are provided as stepped portion which are stepped one step downwards from an outer surface of the resin part 3. As a result, side surfaces 3E are produced between the locking projections 3F and the outer surface of the resin part 3.

Since the locking projections 3F of the resin part 3 are brought into engagement with the locking recesses 2q of the metal part 2, impact forces acting on the metal part in a radial direction and an orthogonal direction can be suppressed.

The side surfaces 3E which drop perpendicularly from the outer surface of the resin part 3 in the vicinity of the axial ends thereof and connect to the locking projections function to suppress strongly an impact force acting on the metal part in the axial direction.

In the modified example to the weight which employs the T-shaped locking projections, as is shown in FIGS. 7C and 7F, T-shaped projecting portions 2r are provided at axial ends of a metal part 2, and T-shaped openings 3G are formed in a resin part 3 in such a manner that the T-shaped projecting portions 2r are embedded therein.

The T-shaped openings 3G in the resin part suppress impact forces acting on the metal part in an axial direction, a radial direction and an orthogonal direction via the T-shaped projecting portions 2r which are brought into engagement with the openings.

It is seen from the results of the measurements and analyses made on the representative examples that the configuration of the weight of the invention can be modified as long as the designed operations and functions are not altered.

As described with reference to the embodiments, the weight for a vibration motor according to the invention adopts the configuration in which the metal part is placed to cover the outer side of the resin part which is securely attached to the shaft of the vibration motor and is locked thereon strongly and rigidly. Since the metal part is configured in such a manner as to be only placed to cover the outer side of the resin part in place of the metal part configuring the whole weight as in the conventional manner, compared with the conventional manner in which the whole weight is made of a metallic material only, the utilization amount of an expensive metallic material can be reduced.

Since the resin metal part made of a resin and having a smaller specific gravity than the metal part is formed in such a manner as to extend from the rotational center and the metal part is disposed radially outwards of the resin part, the position of center of gravity of the weight can be shifted largely radially outwards compared with the position of center of gravity of the conventional weight which is made of metal only. By this configuration, although the weight of the metal part can be reduced much compared with the weight of the conventional weight, a value of rotational moment that is more or less the same as that obtained by the conventional weight can be obtained by extending the length from the axis center to the center of gravity.

By adopting the configuration in which the locking projections at the axial ends of the resin part being locked, respectively, on the locking recesses at the axial ends of the metal part and the elevated portion lying between the locking recesses at the axial ends of the metal part being brought into abutment with the locking projections at the axial ends of the resin part, impacts acting on the weight, in particular, the metal part in three directions, the radial direction, the axial direction and the direction which is orthogonal to these directions, can be suppressed.

In particular, by the locking projection being formed into any of the tapered arc-shaped locking projection which extends along the outer circumference of the semi-cylindrical portion, the edged arc-shaped locking projection and the T-shaped locking projection, impact acting on the locking projection in all the directions, that is, the radial direction, the axial direction and the direction which is orthogonal to these directions can be suppressed.

The radial width and center angle of the metal part are appropriately set to determine a radial width and a center angle which can obtain a required vibration amount from the width/vibration amount characteristics and the center angle/vibration amount characteristics of the vibration motor weight of the invention which is made of the metal part and the resin part, and the radial width and the center angle so obtained are then reflected to the configuration of the vibration motor weight, thereby making it possible to provide a vibration motor weight having an appropriate configuration.

In addition, a metal reduction ratio according to a center angle is obtained by comparing the conventional weight which is made of metal only with the metal/resin integrated weight of the invention, and then, a center angle according to a necessary reduction ratio is obtained from the center angle/reduction ratio characteristics, the center angle so obtained being reflected to an appropriate configuration.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A weight for a vibration motor, the weight comprising:
   a resin part comprising:
      a semi-cylindrical portion having a shaft hole in which a rotary shaft is fitted and expanding radially from the shaft hole at a given center angle so as to be eccentrically weighted with respect to the shaft hole; and
      a pair of locking projections respectively disposed at both axial end areas of an outer circumferential surface of the semi-cylindrical portion so as to extend radially outwardly therefrom; and
   a metal part attached to the resin part so as to sit on the outer circumferential surface of the semi-cylindrical portion, the metal part comprising:
      a pair of locking recesses positioned and configured to correspond respectively to the pair of locking projections of the resin portion, wherein an elevated portion formed between the pair of locking recesses makes contact with the pair of locking projections of the resin portion.

2. The weight according to claim 1, wherein the center angle of the semi-cylindrical portion of the resin part is set to an angle obtained as a required amount of vibration from center angle variation characteristics of a vibration amount in the weight for a vibration motor when the metal part has a constant radial dimension.

3. The weight according to claim 1, wherein the locking projections of the resin part have a substantially triangular shape in an axial cross section.

4. The weight according to claim 3, wherein each of the locking projections comprises:
   an axially inner face inclined with respect to a longitudinal direction of the shaft hole; and
   a pair of circumferential end faces engaged respectively with a pair of circumferential end faces of each of the locking recesses of the metal part.

5. The weight according to claim 1, wherein the locking projections of the resin part have a substantially rectangular shape in an axial cross section.

6. The weight according to claim 5, wherein each of the locking projections comprises:
   a top face;
   an axially inner face connecting between the top face and the outer circumferential surface of the semi-cylindrical portion and oriented substantially perpendicular to the top face and the outer circumferential surface; and
   a pair of circumferential end faces engaged respectively with a pair of circumferential end faces of each of the locking recesses of the metal part.

7. The weight according to claim 1, wherein the locking projections of the resin part have a substantially T-shape in a radial cross section wherein a base portion extends radially outwardly from the outer circumferential surface of the semi-cylindrical portion and a pair of arm portions extend circumferentially from a distal end of the base portion in respective opposite directions.

8. The weight according to claim 7, wherein the elevated portion of the metal part makes contact with axially inner faces of the locking projections of the resin part.

* * * * *